(12) United States Patent
Avidan

(10) Patent No.: US 7,526,101 B2
(45) Date of Patent: Apr. 28, 2009

(54) TRACKING OBJECTS IN VIDEOS WITH ADAPTIVE CLASSIFIERS

(75) Inventor: Shmuel Avidan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 763 days.

(21) Appl. No.: 11/041,338

(22) Filed: Jan. 24, 2005

(65) Prior Publication Data

US 2006/0165258 A1  Jul. 27, 2006

(51) Int. Cl.
*G06K 9/00* (2006.01)
*G06K 9/34* (2006.01)

(52) U.S. Cl. .................. 382/103; 382/173
(58) Field of Classification Search .......... None
See application file for complete search history.

(56) References Cited

U.S. PATENT DOCUMENTS

| | | | |
|---|---|---|---|
| 7,068,815 B2 * | 6/2006 | Chang et al. ............. | 382/106 |
| 7,203,669 B2 * | 4/2007 | Lienhart et al. .......... | 706/48 |
| 7,263,209 B2 * | 8/2007 | Camus et al. ............ | 382/104 |
| 2004/0174496 A1 * | 9/2004 | Ji et al. ................... | 351/209 |

OTHER PUBLICATIONS

Goh et al, "SVM binary classifier ensembles for image classification", CIKM'01, Nov. 5-10, 2001, Atlanta, Georgia, pp. 395-402.*
Avidan S., Support Vector Tracking. *IEEE Trans. on Pattern* Analysis and Machine Intelligence, 2004.
Black, M. J. and Jepson, A. EigenTracking: Robust matching and tracking of articulated objects using a view-based representation. International Journal of Computer Vision, 26(1), pp. 63-84, 1998.
Bobick, A., S.Intille, J.Davis, F.Baird, C.Pinhanez, L.Campbell, Y.Ivanov, A.Schutte, and A.Wilson. The KidsRoom. In *Communications of the ACM*, 43 (3). 2000.
Chu, F., Zaniolo, C. Fast and Light Boosting for Adaptive Mining of Data Streams. The Eighth Pacific-Asia Conference on Knowledge Discovery and Data Mining, 2004.
Collins T. R., Liu, Y. On-Line Selection of Discriminative Tracking Features. Proceedings of the International Conference *on Computer Vision* (ICCV '03), France, 2003.
Comanciu, D., Visvanathan R., Meer, P. Kernel-Based Object Tracking. *IEEE Trans. on Pattern Analysis and Machine Intelligence* (PAMI), 25:5, pp. 564-575, 2003.
Crowley, J., Berard, F. Multi-Modal Tracking of Faces for Video Communications. Proceedings of the Conference on Computer Vision and Pattern Recognition (CVPR '97), Puerto Rico 1997.

(Continued)

*Primary Examiner*—Matthew C Bella
*Assistant Examiner*—Yuzhen Ge
(74) *Attorney, Agent, or Firm*—Dirk Brinkman; Gene Vinokur

(57) ABSTRACT

A method locates an object in a sequence of frames of a video. A feature vector is constructed for every pixel in each frame. The feature vector is used to training the weak classifiers. The weak classifiers separate pixels that are associated with the object from pixels that are associated with the background. The set of weak classifiers are combined into a strong classifier. The strong classifier labels pixels in a frame to generate a confidence map. A 'peak' in the confidence is located using a mean-shift operation. The peak indicates a location of the object in the frame. That is, the confidence map distinguishes the object from the background in the video.

14 Claims, 1 Drawing Sheet

OTHER PUBLICATIONS

Darrell, T., Gordon, G., Harville, M., and Wood_ll, J. Integrated person tracking using stereo, color, and pattern detection. Proceedings of the Conference on Computer Vision and *Pattern Recognition* (CVPR '98), pp. 601-609, Santa Barbara, Jun. 1998.

Freund, Y. An adaptive version of the boost by majority algorithm. In *Machine Learning*, 43 (3) :293-318, Jun. 2001.

Freund, Y. Schapire, R. E. A decision-theoretic generalization of on-line learning and application to boosting. In Computational Learning Theory: Eurocolt 95, pp. 23-37, 1995.

Georescu, B., Shimshoni, I., Meer, P. Mean-shift Based Clustering in High Dimensions: A Texture Classification Example. Proceedings of the International Conference on Computer *Vision* (ICCV '03), France, 2003.

Ho, J., Lee K., Yang, M., Kriegman, D. Visual Tracking Using Learned Linear Subspaces. In *IEEE Conf. on Computer* Vision and Pattern Recognition, 2004.

Isard, M., Blake, A. Condensation—Conditional Density Propagation for Visual Tracking, *International Journal of Computer Vision*, vol. 29(1), pp. 5-28, 1998.

Jepson, A.D., Fleet, D.J. and El-Maraghi, T. Robust on-line appearance models for vision tracking. In *IEEE Transactions* on Pattern Analysis and Machine Intelligence 25(10):1296- 1311. 2001 YG.

Kotler, J., Maloof, M. Dynamic Weighted Majority: A new Set Method for Tracking Concept Drift. In *Proceedings* of the Third International IEEE Conference on Data Mining, 2003.

Levi, K., Weiss, Y. Learning Object Detection from a Small Number of Examples: The Importance of Good Features. In IEEE Conf. on Computer Vision and Pattern Recognition, 2004.

Stauffer, C. and E. Grimson, *Learning Patterns of Activity Using Real-Time Tracking*, PAMI, 22(8):747-757, 2000.

* cited by examiner

TRACKING OBJECTS IN VIDEOS WITH ADAPTIVE CLASSIFIERS

FIELD OF THE INVENTION

The invention relates generally to computer vision, and more particularly to tracking objects in videos.

BACKGROUND OF THE INVENTION

Object Tracking

Object tracking is used in many computer vision applications, such as surveillance, Stauffer et al., "Learning Patterns of Activity Using Real-Time Tracking," PAMI, 22(8), pp. 747-757, 2000; driver assistance systems, Avidan, "Support Vector Tracking," IEEE Trans. on Pattern Analysis and Machine Intelligence, 2004; and human-computer interactions, Bobick et al., "The KidsRoom," Communications of the ACM, 43(3), 2000. The wide range of objects to be tracked poses a challenge to any object tracking application. Different object representations, such as color histograms, appearance models or key-points, have been used for object tracking.

Simple object tracking finds a region in a sequence of frames of a video that matches an object. In terms of machine learning, this is equivalent to a nearest neighbor classification. The simple approach ignores the role of the background.

Filtering can be used to assign probabilities to different matches. Unfortunately, filter methods do not affect a description of the object. The description could be used to better separate the object from the background. Hence, a better approach would change the object descriptor so that the object can be distinguished from the background.

Classifiers

A strong classifier combines a set of weak classifiers. The combination can be linear or non-linear. For example, the well-known AdaBoost process trains each classifier in a set of weak classifier on increasingly more difficult training data. The weak classifiers are then combined to produce a strong classifier that is better than any of the weak classifiers, Freund et al., "A decision-theoretic generalization of on-line learning and an application to boosting," Computational Learning Theory, Eurocolt '95, pp. 23-37, 1995. Freund presents the "boost-by-majority" algorithm that is considerably more efficient. The Freund algorithm works by calling a given weak learning algorithm WeakLearn multiple times, each time presenting it with a different distribution over the domain X, and finally combining all of the generated hypotheses into a single hypothesis. This is the boosting process. The intuitive idea is to alter the distribution over the domain X in a way that increases the probability of the "harder" parts of the space, thus forcing the weak learner to generate new hypotheses that make less mistakes on these parts.

Mean shift is a mode-seeking process that works on the gradient of a distribution to find a peak. Mean-shift searches for regions in an image that has a color histogram similar to a given color histogram. To improve performance, Comanciu et al. used spatial smoothing, Comanciu et al, "Kernel-Based Object Tracking," IEEE Trans. on Pattern Analysis and Machine Intelligence, (PAMI), 25:5, pp. 564-575, 2003. Comanciu provides an approach toward target representation and localization. The feature histogram based target representations are regularized by spatial masking with an isotropic kernel. The masking induces spatially-smooth similarity functions suitable for gradient-based optimization. hence, the target localization problem can be formulated using the basin of attraction of the local maxima. Comanciu employs a metric derived from the Bhattacharyya coefficient as a similarity measure, and uses the mean shift procedure to perform the optimization. Comanciu states that his distance (similarity) function is smooth. Thus, his procedure can use gradient information, which is provided by the mean shift vector. The mean shift procedure finds a root of the gradient as function of location on the distance function. Thus, the mean shift procedure finds the local maximum (peak) of a scalar field of correlation coefficients. In addition, colors that appear outside the object are used to 'down-weight' colors that appear on the object.

Temporal integration methods, such as particle filtering, properly integrate measurements over time, Isard et al., "CONDENSATION—Conditional Density Propagation for Visual Tracking," International Journal of Computer Vision, Vol 29(1), pp. 5-28, 1998.

The 'WSL' tracker maintains short-term and long-term object descriptors, Jepson et al., "Robust on-line appearance models for vision tracking," IEEE Transactions on Pattern Analysis and Machine Intelligence 25(10), pp. 1296-1311. The descriptors are updated and reweighted continuously using an expectation-maximization (EM) process.

An incremental sub-space method continuously updates an adaptive sub-space to maintain a stable object descriptor, Ho et al., "Visual Tracking Using Learned Linear Subspaces," IEEE Conf. on Computer Vision and Pattern Recognition, 2004.

Data mining uses concept-drift. There, the goal is to quickly scan a large amount of data and learn a "concept." As the concept drifts, the classifier is adapted. For example, a "dynamic weighted majority" can track concept-drift for data mining applications, Kotler et al., "Dynamic Weighted Majority: A new Set Method for Tracking Concept Drift," Proceedings of the Third International IEEE Conference on Data Mining, 2003.

Another method adds change detection to concept-drift to detect abrupt changes in the concept, Chu et al., "Fast and Light Boosting for Adaptive Mining of Data Streams," The Eighth Pacific-Asia Conference on Knowledge Discovery and Data Mining, 2004. That method is similar to the WSL tracker of Jepson et al.

Feature selection can select from a set of different color spaces and 'switch' to the most discriminative color space, Collins et al., "On-Line Selection of Discriminative Tracking Features," Proceedings of the International Conference on Computer Vision (ICCV '03), 2003. That method uses a fixed discrete histogram of features in a low-dimensional feature space to generate a confidence map for the mean-shift operation.

SUMMARY OF THE INVENTION

The invention treats object tracking as a binary classification problem. A set of weak classifiers is trained to distinguish between an object and the background in a sequence of frames of a video acquired of a scene. The training is performed as the video is acquired. That is, the invention works adaptively in real-time.

A feature vector is constructed for every pixel in each frame. The feature vector is used to training the weak classifiers. The weak classifiers separate pixels that are associated with the object from pixels that are associated with the background.

The set of weak classifiers are combined into a strong classifier. The strong classifier labels pixels in a frame to generate a confidence map. A 'peak' in the confidence is located using a mean-shift operation. The peak indicates a location of the object in the frame. That is, the confidence map distinguishes the object from the background in the video.

If the object and background are relatively static in the scene, then training the classifiers when the object tracking is initialized would suffice. However, if the object and background change over time, then the classifiers must be adapted accordingly. Therefore, temporal coherence is maintained by updating the set of weak classifiers with additional weak classifiers as the set is trained during the object tracking. Old classifiers are removed.

In addition, the number of classifiers in the set can be adapted according to a success rate for locating the object. Thus, for easy-to-distinguish objects, the set includes only one or two weak classifiers, and for difficult to detect objects, five to seven classifiers can be used.

Thus, the set of classifiers achieves two goals. Each weak classifier is 'tuned' to separate the object from the background in a particular frame and the set, as a whole ensures, temporal coherence.

The object tracking method according to the invention has several advantages. The method breaks the time consuming training phase into a sequence of simple and easy to compute training tasks that can be performed in real-time. The method automatically adjusts the weights of the different weak classifiers in the set. Furthermore, the weak classifiers can be trained on different feature spaces.

The method can also integrate off-line and on-line training. For example, if the object class to be tracked is known, then several weak classifiers can be trained off-line on large training data set. These classifiers can be used in addition to the classifiers trained in real-time. Integrating classifiers over time improves the stability of the object tracking in cases of object occlusions or illumination changes in the scene.

DETAILED DESCRIPTION OF THE PREFERRED EMBODIMENT

Object Tracking

Figure 1:
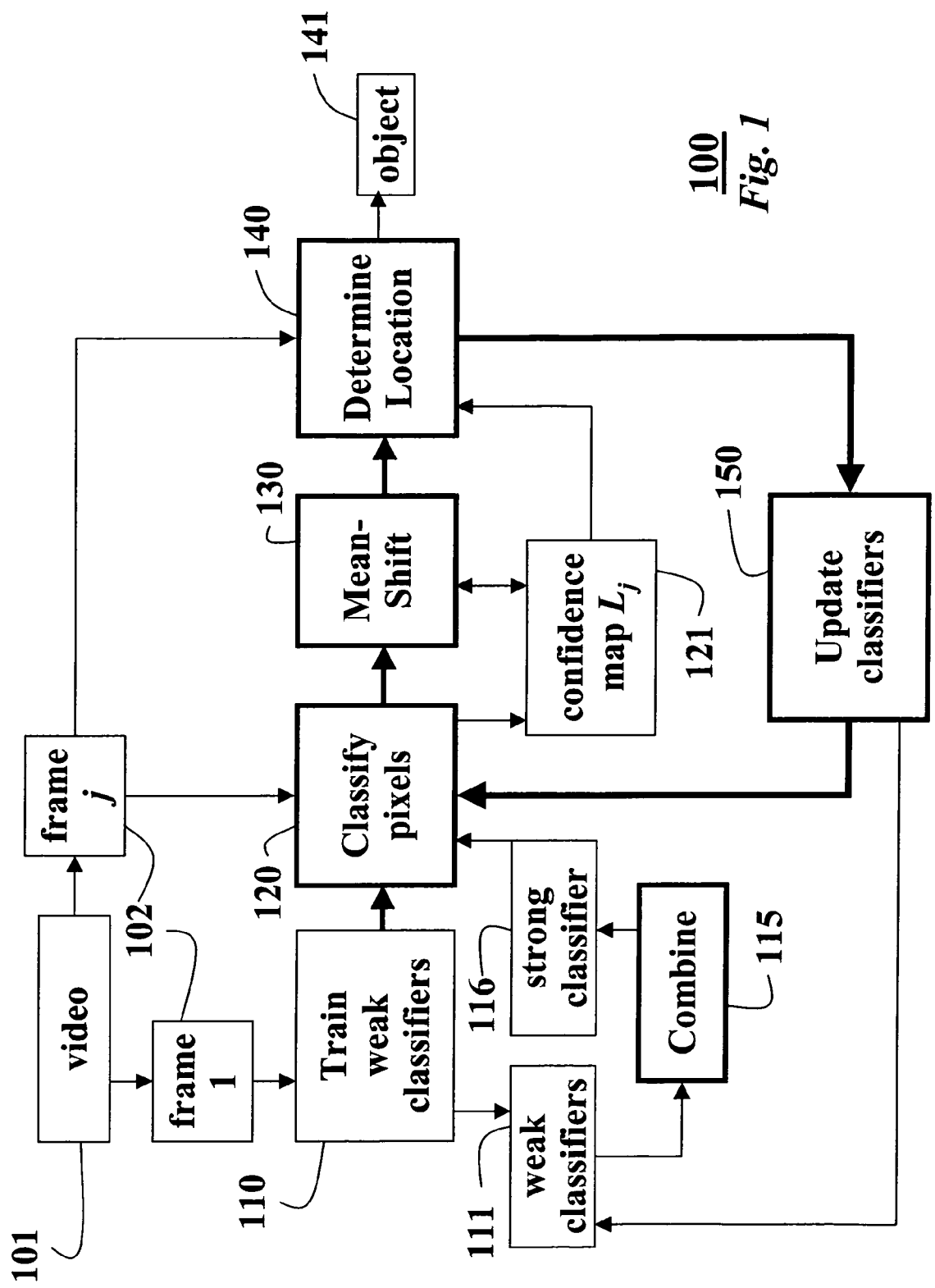
FIG. 1 is a flow diagram of a method for tracking objects adaptively according to the invention.

The invention provides a method for tracking an object adaptively in a sequence of frames (images) of a video acquired of a scene by a camera. The invention allows a changing background and a moving camera. The invention treats object tracking as a binary classification problem with the object being in the 'foreground' and the remainder of the scene being the 'background'.

A set of weak classifiers is updated for each frame. The weak classifiers are combined into a strong classifier. The strong classifier separates the object from the background. Weak classifiers can be added to the set or removed from the set at any time to incorporate changes in the appearance of the object and the background over time.

The invention does not represent the object explicitly. Instead, the set of classifiers determines whether a particular pixel is associated with the object or with the background. Each weak classifier is trained on positive and negative training examples. Positive examples are associated with the object and negative examples are associated with the background.

The set of classifiers are used to generate a confidence map, where a margin is used as a confidence measure. A mean-shift operation is used to detect a 'peak' in the confidence map. The peak indicates the location of the object.

Initialization

FIG. 1 shows the method 100 according to the invention for tracking an object in a sequence of frames of a video 101. Input to the method are frames 102, $I_1, \ldots, I_n$. A tracking rectangle $r_1$ can enclose the object in the first frame $I_1$. This can be done manually or by using a conventional object detector. Output of the method is rectangles $r_2, \ldots, r_n$, 141, i.e., the locations of the object in subsequent frames.

During initialization, i.e., for the first frame $I_1$, a set of weak classifiers 111 is trained 110. The set of weak classifiers is combined 115 to produce a strong classifier 116. It should be noted that the classifiers can be trained prior to performing the method. The combination can be linear or non-linear.

Typically three to five classifiers are used. However, instead of fixing the number of weak classifiers in advance as in the prior art, the invention can work with a variable number of classifiers. In other words, not only are the classifiers individually adapted, but also the number of classifiers is adapted. For example, a predetermined classification threshold can be set, and the number of weak classifiers in the set can be selected to achieve this threshold. For example, if the object is distinctive from the background, a single classifier can be used. If the object is similar to the background, then five to seven classifiers are used.

Method Steps

There are four main steps in the method 100 according to the invention, each step is applied, in turn, to each frame in the video. The strong classifier 116 is used to classify 120 the pixels in each frame $I_j$. The classified pixels form a confidence map $L_j$ 121 for each frame.

A mean-shift operation 130 is applied to the confidence map 121 to detect a 'peak'. The peak is used to determine 140 the location of the rectangle $r_j$ 141 in the current frame, i.e., the location of the object as the object moves.

The current frame $I_j$ is then used to update 150 the classifiers. Selected weak classifiers are removed 150 from the set 111, and new classifiers can be added and combined with remaining classifiers to adapt the strong classifier 116 to the changes in appearance of the scene and the object.

These steps are then repeated for each next frame using the updated classifiers.

The pseudocode for the adaptive tracking method according to the invention is given in Appendix A.

Weak Classifiers

For each pixel in the current frame, extract a d-dimensional feature vector that characterizes of local information near the pixel. In particular, the feature vector is 11-dimensional. The feature vector is a combination of, e.g., eight bins of a local orientation histogram based on intensity gradients and three pixel colors (RGB). The 8-bin local orientation histogram is determined over a 5×5 window centered on the pixel.

To improve performance, only edges that are above some predetermined threshold, e.g., ten intensity values, are counted. These features are easy to extract and convey sufficient information for object detection. The feature vector is a count of oriented edges in a local neighborhood. For example, a feature vector for a given pixel can indicate three horizontal edges, two vertical edges and no diagonal edges in the vicinity of the pixel. This representation has several advantages. First it is less sensitive to illumination changes because the feature vector does depend on the length of the edge, only that the edge is above some threshold, e.g., ten intensity values. Second, the feature vector gives a local description of the image patch that is robust to small image plane transformations.

Practically, the feature vector is an 11-demensional vector that consists of the RGB values of the pixel as well as the histogram of the number of oriented edges in the local 5×5 neighborhood. That is, all edges in the window that are above the threshold are located and counted, and the edges are clustered into bins according to their orientation and count.

Other features, such as those obtained from a bank of filters can also be used. Other classifiers, such as stumps, i.e., single node decision trees or perceptrons, can be used instead of the least-squares based classifier.

In the preferred embodiment, the same features are used for all classifiers. However, other techniques, such as fusing various cues, can improve the tracking.

Let $\{x_i, y_i\}_{i=1}^n$ denote N examples and their labels, respectively, where $x_i \in \Re^d$, and $y_i \in \{-1, +1\}$. The weak classifier is $h(x): \Re \to \{-1, +1\}$, where $h(x)$ is the sign of a linear classifier trained in a least-squares manner. Least-squares solutions are slower to be determined than color-histograms that are often used in mean-shift tracking, however, they scale to high dimensions. By using a set of classifiers and running mean-shift on their output, i.e., the confidence map 121, the method indirectly applies the mean-shift to high-dimensional data.

The temporal coherence of the video is exploited by updating 150 the classifiers over time for each frame. For each frame, the K 'oldest' weak classifiers removed 150, and new weak classifiers can be trained to reconstruct the strong classifier 116. Knowledge about the object to be tracked can be incorporated into the updating. For example, certain weak classifiers are never removed during the updating.

The result of the classifier $h(x)$, in the form of a margin, is mapped to a confidence value $c(x)$ in the confidence map 121. The mapping uses a sigmoid function that ensures that the confidence values are normalized to the range [0, 1]. The confidence map 121 is then is fed to the mean-shift step 130.

Classifier Update

In the update step 150, 'old' weak classifiers are removed from the set to make room for some new weak classifiers. However, before new weak classifiers are added, weights of the remaining weak classifiers are adjusted. This can be done either by forming a least-squares problem in which the weights are unknown and the weak classifiers are known, or by running the well known AdaBoost process.

The updating step provides AdaBoost one weak classifier at a time from the existing set of weak classifiers. This saves training time and generates a strong classifier, as well as a sample distribution that can be used for training the new weak classifier.

Care is taken when adding or re-weighting a weak classifier that does not perform much better than 'chance'. During weight re-calculation, if the weak classifier performs worse than chance, then the weight of that classifier is set to zero. Thus, a new weak classifier must perform better than chance with some predetermined margin, e.g., err=0.4. That is, the updating in step (7) of the pseudocode is terminated if this condition is not satisfied.

This is especially important in case of occlusions or severe illumination artifacts where the weak classifier might be trained on data that does not belong to the object but rather to the occluding object or to the illumination.

Outlier Rejection

If the object to be tracked does not match the shape of the tracking rectangle r, then some pixels can be mislabeled. Because AdaBoost is sensitive to outliers, outliers are rejected. A simple approach treats 'difficult' pixels as outliers and changes their labels.

Specifically, a steady state of the step (4) of the pseudocode can be written as follows:

$$y_i = \begin{cases} +1 & \text{inside}(r_j, p_i) \\ -1 & \text{otherwise} \end{cases},$$

where $r_j$ is a current rectangle enclosing the object, $p_i$ is a current pixel, and inside(r, p) is a predicate that is true (+1) when the pixel p is inside rectangle r, and false (−1) otherwise.

An outlier rejection version can be expressed as:

$$y_i = \begin{cases} +1 & \text{inside}(r_j, p_i) \wedge (w_i < \Theta) \\ -1 & \text{otherwise} \end{cases},$$

where $w_i$ is the weight of the pixel $p_i$ after applying the strong classifier and $\Theta$ is a predetermined, predefined threshold, e.g., $\Theta=3/N$, where N is the number of examples. That is, pixels inside the tracking rectangle are assumed to be positive examples, unless the pixels are too 'difficult' to classify. Difficult pixels are changed to negative (background). Outlier rejection improves the confidence maps and lead to a more stable tracking process.

Multi-Resolution Tracking

The object tracking can be performed using multiple resolutions, e.g., full, half, and one-quarter frame sizes. This enables the object tracker to extract features at multiple scales. Tracking is performed independently for each resolution level. Each level produces a corresponding confidence map. The correspondence maps are then combined, based on the classification score of the classifier at each level.

Specifically, the weak classifiers are trained for each resolution level, and a one strong classifier is maintained for each resolution level. Each strong classifier generates a confidence map. All of the confidence maps are resized to the size of the original frame and a weighted average forms the confidence map 121 that is used for the mean-shift operation 130.

EFFECT OF THE INVENTION

In effect, the invention treats object tracking as a binary classification problem. A set of weak classifiers is adapted in real-time to distinguish between features of an object and features of the background. Combining the weak classifiers forms a strong classifier. The strong classifier is then used to generate a confidence map for each frame. A peak in the map, and hence the location of the object, is found using mean-shift operation. The classifier is updated, over time, to adjust for changes in appearance of the object and background.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

Appendix

Algorithm 1 General Ensemble Tracking
Input: n video frames $I_1, \ldots, I_n$, Rectangle $r_1$ of object in first frame
Output: Rectangles $r_2, \ldots, r_n$
Initialization (for frame $I_1$):

Train several weak classifiers and add them to the ensemble
For each new frame $I_j$ do:
    Test all pixels in frame $I_j$ using the current strong classifier and create a confidence map $L_j$
    Run mean shift on the confidence map $L_j$ and report new object rectangle $r_j$
    Label pixels inside rectangle $r_j$ as object and all those outside it as background
    Remove old weak classifiers
    Train new weak classifiers on frame $I_j$ and add them to the ensemble Algorithm 2 Specific Ensemble Tracking
Input: n video frames $I_1, \ldots, I_n$ Rectangle $r_1$ of object in first frame
Output: Rectangles $r_2, \ldots, r_n$
Initialization (for frame $I_1$):
1. Extract $\{x_i\}_{i=1}^N$ examples with labels $\{y_i\}_{i=1}^N$
2. Initialize weights $\{w_i\}_{i=1}^N$ to be $1/N$
3. For $t=1 \ldots T$,
    (a) Make $\{w_i\}_{i=1}^N$ a distribution
    (b) Train weak classifier $h_t$
    (c) Set err=$\Sigma_{i=1}^N w_i |h_t(x_i)-y_i|$
    (d) Set weak classifier weight $\alpha_t=\frac{1}{2} \log 1-\text{err}/\text{err}$
    (e) Update examples weights $w_i=w_i e^{(\alpha_t|h_t(x_i)-y_i|)}$
4. The strong classifier is given by sign(H(x)) where $H(x)=\Sigma_{t=1}^T \alpha_t h_t(x)$
For each new frame $I_j$ do:
1. Extract $\{x_i\}_{i=1}^N$ examples
2. Test the examples using the strong classifier H(x) and create confidence image $L_j$
3. Run mean-shift on $L_j$ with $r_{j-1}$ as the initial position of the rectangle and set the position of $r_j$ to the peak of the confidence image
4. Define labels $\{y_i\}_{i=1}^N$ with respect to the new rectangle $r_j$. Pixels inside the rectangle are labeled +1 and those outside the rectangle are labeled −1.
5. Remove K oldest weak classifiers
6. Initialize weights $\{w_i\}_{i=1}^N$ to be $1/N$
7. For $t=K+1 \ldots T$, (Update weights)
    (a) Make $\{w_i\}_{i=1}^N$ a distribution
    (b) Set err=$\Sigma_{i=1}^N w_i |h_t(x_i)-y_i|$
    (c) Set weak classifier weight $\alpha_t=\frac{1}{2} \log 1-\text{err}/\text{err}$
    (d) Update examples weights $w_i=w_i e^{(\alpha_t|h_t(x_i)-y_i|)}$
8. For $t=1 \ldots K$, (Add new weak classifiers)
    (a) Make $\{w_i\}_{i=1}^N$ a distribution
    (b) Train weak classifier $h_t$
    (c) Set err=$\Sigma_{i=1}^N w_i |h_t(x_i)-y_i|$
    (d) Set weak classifier weight at $\alpha_t=\frac{1}{2} \log 1-\text{err}/\text{err}$
    (e) Update examples weights $w_i=w_i e^{(\alpha_t|h_t(x_i)-y_i|)}$
9. The updated strong classifier is given by sign(H(x)) where $H(x)=\Sigma_{t=1}^T \alpha_t h_t(x)$

The invention claimed is:

1. A method for tracking a moving object in a sequence of frames acquired of a scene, each frame including a plurality of pixels, comprising for each frame the steps of:
classifying the plurality of pixels with a strong classifier to generate a confidence map corresponding to the frame;
applying a mean-shift operation to the confidence map to detect a peak, the peak corresponding to a location of the object in the frame; and
updating the strong classifier, and in which the steps are performed using multiple resolutions, and in which there is one confidence map at each resolution, and in which the confidence maps at the multiple resolutions are averaged.

2. The method of claim 1, further comprising:
enclosing the object with a tracking rectangle.

3. The method of claim 1, further comprising:
combining a set of weak classifiers to form the strong classifier.

4. The method of claim 3, in which the updating removes selected weak classifiers and adds new weak classifiers to adapt the strong classifier to changes in appearance of the scene and the object over time.

5. The method of claim 3, further comprising:
extracting, for each pixel, a d-dimensional feature vector that characterizes local information near the pixel; and
training the weak classifiers with the d-dimensional feature vector.

6. The method of claim 5, in which the feature vector is 11-dimensional.

7. The method of claim 5, in which the feature vector includes eight bins of a local orientation histogram based on image intensity gradients and three pixel colors.

8. The method of claim 7, in which the eight bins are determined over a 5×5 window centered on the pixel.

9. The method of claim 5, further comprising:
rejecting outlier pixels during the training.

10. The method of claim 3, further comprising:
assigning a weight to each weak classifier.

11. The method of claim 1, in which the combining is linear and weighted.

12. The method of claim 1, in which the resolutions include a full, half, and one quarter frame sizes.

13. The method of claim 1, in which a number of weak classifiers in the set changes over time according a success rate for locating the object.

14. The method of claim 1, in which results of the classifying are in a form of margins that are mapped to confidence values using a sigmoid function to ensures that the confidence values are normalized to a range [0, 1].

* * * * *